(12) United States Patent
Nicholson et al.

(10) Patent No.: US 7,739,549 B2
(45) Date of Patent: *Jun. 15, 2010

(54) DEVICE, SYSTEM AND METHOD FOR PREDICTIVE FAILURE ANALYSIS

(75) Inventors: Robert Bruce Nicholson, Southsea (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 12/052,136

(22) Filed: Mar. 20, 2008

(65) Prior Publication Data

US 2008/0209274 A1    Aug. 28, 2008

Related U.S. Application Data

(63) Continuation of application No. 10/666,970, filed on Sep. 17, 2003, now Pat. No. 7,370,241.

(30) Foreign Application Priority Data

Sep. 17, 2002    (GB)    ................... 0221638.0

(51) Int. Cl.
    *G06F 11/00*    (2006.01)
(52) U.S. Cl. ................ 714/37; 714/47; 714/42; 714/4; 702/185
(58) Field of Classification Search ........... 714/47, 714/42, 37; 702/185
    See application file for complete search history.

(56) References Cited

U.S. PATENT DOCUMENTS

| | | | |
|---|---|---|---|
| 5,123,017 A | 6/1992 | Simpkins et al. | 714/26 |
| 6,138,249 A | 10/2000 | Nolet | 714/25 |
| 6,317,701 B1 | 11/2001 | Pyotsia et al. | 702/188 |
| 6,405,108 B1 | 6/2002 | Patel et al. | 701/29 |
| 6,609,212 B1 | 8/2003 | Smith | 714/4 |
| 6,651,192 B1 | 11/2003 | Viglione et al. | 714/47 |
| 6,772,033 B2 | 8/2004 | Scherer et al. | 700/115 |
| 6,948,102 B2 | 9/2005 | Smith | 714/47 |
| 6,980,381 B2 | 12/2005 | Gray et al. | 360/31 |
| 7,191,230 B1 | 3/2007 | Chakravarti et al. | 709/224 |
| 7,239,968 B2 | 7/2007 | Fasullo et al. | 702/58 |
| 7,272,755 B2 | 9/2007 | Smith | 714/47 |
| 7,308,385 B2* | 12/2007 | Wegerich et al. | 702/183 |
| 7,336,455 B2* | 2/2008 | Dimino et al. | 361/24 |
| 7,346,475 B2* | 3/2008 | Dimino et al. | 702/185 |
| 7,373,553 B2* | 5/2008 | Tripp et al. | 714/37 |
| 7,376,870 B2* | 5/2008 | Kataria et al. | 714/47 |

(Continued)

OTHER PUBLICATIONS

Microsoft Computer Dictionary, 4th Ed., Microscoft Press, 1999, p. 242.

*Primary Examiner*—Christopher S McCarthy
(74) *Attorney, Agent, or Firm*—Harrington & Smith

(57) ABSTRACT

A large population of mass-produced devices (80) such as a particular model of computer hard disk drive, are distributed around the world. Each device (80) includes an arrangement for collecting failure analysis data of the device (50). Each device (80) is arranged to transmit this data to the device manufacturers server (10) via the internet (20). The server (10) analyses the data in order to determine trends in failure performance of the population of devices in order to improve future designs and to provide updated software for distribution to the devices (80) via the internet (20).

32 Claims, 4 Drawing Sheets

U.S. PATENT DOCUMENTS

| | | | |
|---|---|---|---|
| 7,457,675 B2* | 11/2008 | Vesel | 700/83 |
| 7,523,016 B1* | 4/2009 | Surdulescu et al. | 702/185 |
| 7,523,182 B2* | 4/2009 | Godwin | 709/223 |
| 2002/0162048 A1 | 10/2002 | Ackaret et al. | 714/6 |
| 2003/0004679 A1 | 1/2003 | Tryon et al. | 702/182 |
| 2003/0028829 A1 | 2/2003 | Slater et al. | 714/47 |
| 2003/0061546 A1 | 3/2003 | Collins et al. | 714/42 |
| 2003/0088538 A1 | 5/2003 | Ballard | 707/1 |
| 2004/0162940 A1 | 8/2004 | Yagisawa et al. | 711/114 |
| 2004/0225911 A1 | 11/2004 | Smith | 714/4 |
| 2005/0044451 A1 | 2/2005 | Fry et al. | 714/38 |
| 2005/0081119 A1 | 4/2005 | DiZoglio et al. | 714/47 |
| 2005/0222817 A1 | 10/2005 | Achacoso et al. | 702/185 |
| 2006/0009951 A1 | 1/2006 | Tryon et al. | 702/185 |
| 2006/0143493 A1 | 6/2006 | Meis et al. | 714/4 |
| 2006/0277446 A1 | 12/2006 | Ikeno et al. | 714/47 |
| 2007/0022320 A1 | 1/2007 | Flocken et al. | 714/37 |
| 2008/0010554 A1* | 1/2008 | Gonguet et al. | 714/47 |
| 2008/0126875 A1* | 5/2008 | Stowers et al. | 714/42 |

* cited by examiner

DEVICE, SYSTEM AND METHOD FOR PREDICTIVE FAILURE ANALYSIS

CROSS REFERENCE

This patent application is a continuation application of U.S. application Ser. No. 10/666,970, filed Sep. 17, 2003 now U.S. Pat. No. 7,370,241 which claims priority under 35 U.S.C. §119(a) to foreign application Serial No. 0221638.0, filed in the United Kingdom on 17 Sep. 2002, and entitled "Device, System and Method for Predictive Failure Analysis". The disclosure of which is incorporated by reference in its entirety insofar as it does not conflict with the teachings of the present invention.

FIELD OF THE INVENTION

This invention relates to predictive failure analysis for devices, and particularly but not exclusively to mass-produced hard disk drive devices.

BACKGROUND OF THE INVENTION

In the field of this invention it is known that many types of computer hardware are able to perform self-diagnosis of impending failure conditions. For example, computer hard disk drives are arranged to generate predictive failure analysis information. Furthermore error recovery in disk drives has improved in recent years such that devices can continue to function for many months or years with a high recovered error rate.

However with time a point may arrive at which the unrecovered error rate becomes unacceptably high, or the number or severity of the recovered errors may become symptomatic of an impending total failure. Predictive failure analysis algorithms within the disk drive firmware are used to estimate this point and to generate alerts to users, informing them that a service action should be scheduled to replace the hardware which may be about to fail. Such alerts are critical for server based data storage systems. Although advances in redundancy and back-up technology now mean that in many cases little or no data loss will result when such a failure occurs, nevertheless the resulting 'downtime' of such a system while recovery actions are taken and new hardware is ordered and installed may be unacceptable for many business applications. Early warning of such failure enables users to plan for and minimise such disruption.

However, this approach has the disadvantage(s) that these predictive failure analysis algorithms are devised while the device is under development and are based upon the data available at that time, such as early test results, experience with previous drive generations and the results of accelerated ageing tests (thermal or vibration stress). The error tolerance in such algorithms is therefore relatively wide.

It is necessary to set the threshold at which a device is called out for replacement to a fairly high level to avoid expensive hardware replacement costs, however this is difficult to do with such a wide error tolerance without risking an unacceptably high number of errors for the user.

Disk drive manufacturers typically receive predictive failure analysis information from disk drives that have been called out for replacement on a per device basis, but recovered error information is not typically received from the drives that are functioning within their tolerances.

U.S. Pat. No. 5,123,017 discloses a system in which sensors are retrofitted to different elements of a hardware system and are arranged to send information over a closed network to a central location. The information is used for diagnosing failures in order to facilitate the field replacement of faulty elements. In addition the information is used for predicting future failures.

A need therefore exists for an improved device, system and method for predictive failure analysis wherein the abovementioned disadvantages may be alleviated.

STATEMENT OF INVENTION

In accordance with a first aspect of the invention there is provided a system for improving predictive failure attributes of distributed devices, comprising: a plurality of devices, each device including failure sensing means arranged for collecting failure analysis data of the device and communication means coupled to the failure sensing means and arranged for transmitting the failure analysis data; a network coupled to the communication means of each of the plurality of devices; and, a server coupled to receive the failure analysis data of each of the plurality of devices via the network; wherein the server is arranged for analysing the failure analysis data received from each of the plurality of devices and for providing failure information.

In accordance with a second aspect of the invention there is provided a device comprising: failure sensing means arranged for collecting failure analysis data of the device; and, communication means coupled to the failure sensing means and arranged for transmitting the failure analysis data to a remote server via a network, wherein the server is arranged for analysing the failure analysis data received from the device and from other devices and for providing failure information.

In accordance with a third aspect of the invention there is provided a method for performing predictive data analysis of a number of distributed devices, the method comprising the steps of: collecting failure analysis data from a number of failure tolerant components of the number of distributed devices; transmitting the failure analysis data to a central server via a network coupled to each of the devices; processing the failure analysis data; analysing the failure analysis data received from each of the plurality of devices; and providing failure information therefrom.

Preferably the device includes an algorithm for managing the operation of the failure tolerant component and the failure information includes an updated algorithm for providing improved operation of the failure tolerant component. The updated algorithm is preferably transmitted to the device via the network.

The failure information is preferably used to improve design and manufacturing steps for future devices. Preferably it also provides an indication of operating lifespan of the devices.

Preferably the device is coupled to the network via an intermediary software agent. The intermediary software agent is preferably installed on a local server.

The local server preferably includes a database arranged for storing the failure analysis data from the device, the local server being arranged for periodically uploading the failure analysis data to the manufacturer's server.

In this way information is provided from a large population of drives in the field population, and may be used to perform detailed analysis with greater predictability and less tolerance than present arrangements. Trends or unexpected failure modes may also be detected. The information may be used to improve the operation of the hard disk drives in the field, or to make improvements to future designs.

BRIEF DESCRIPTION OF THE DRAWINGS

One device, system and method for predictive failure analysis incorporating the present invention will now be described, by way of example only, with reference to the accompanying drawings, in which.

DESCRIPTION OF PREFERRED EMBODIMENT(S)

Figure 1:
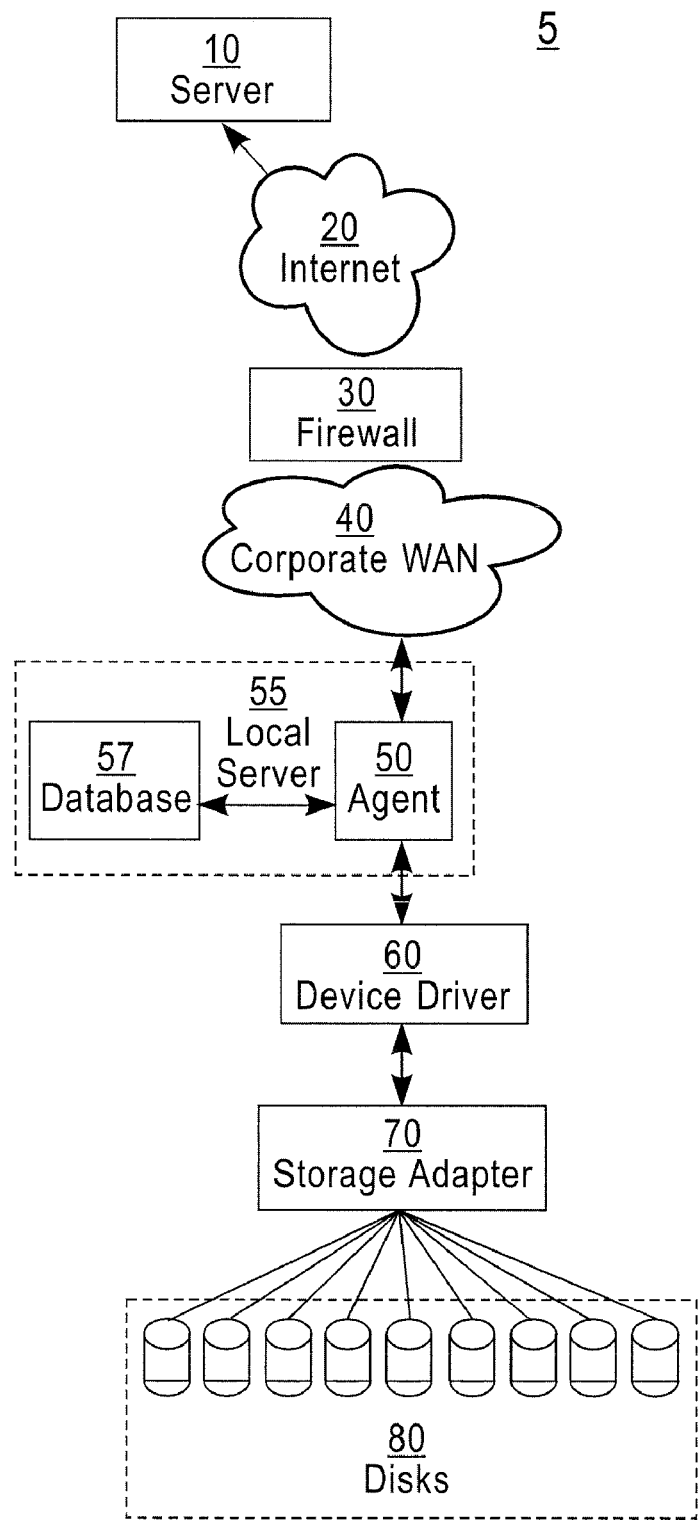
FIG. 1 shows a preferred embodiment of a system for predictive failure analysis in accordance with the invention.

Referring to FIG. 1, there is shown a system 5 comprising a manufacturers server 10, utilised by a disk drive manufacturer in a manner to be further described below, coupled to a corporate Wide Area Network (WAN) 40 via the internet 20 and a firewall 30. A number of disk drives 80 (manufactured by the disk drive manufacturer) are coupled to a device driver 60 via a storage adapter 70. The driver 60, adapter 70 and disk drives 80 are all operated by a customer, and used for typical disk drive applications, such as databases, servers, data storage and the like.

The disk drives 80 are mass-produced by the manufacturer, and may be substantially identical to each other, or may be variants of a particular family of disk drive designs. For example they may be different sizes. It is envisaged that the manufacturer may produce many thousands of disk drives of that family.

A software agent 50 is coupled between the device driver 60 and the corporate WAN 40. The software agent 50 may be run on a local server 55 which attaches to the disk drives 80, or by other means. The software agent 50 gathers recovered error and other predictive statistical data from the disk drives 80, and in a preferred embodiment this predictive failure data is temporarily stored in a local database 57 on the local server 55.

Periodically the predictive failure information is uploaded to the manufacturers server 10 via the corporate WAN 40 and internet 20.

It will be appreciated that the data can be directly uploaded to the manufacturers server 10 as it becomes available. However the database 57 helps to address the scaling issue as the manufacturers server 10 may be servicing field populations numbering many thousands or millions of individual devices.

The protocol used to upload data to the manufactures server 10 is not central to the invention but should be selected so that it can easily pass through the fire-wall 30 between the corporate WAN 40 and the Internet 20. In the preferred embodiment an http protocol is used because most corporate fire-walls are able to pass http requests.

If the device driver 60 of the disk drives 80 is connected directly to a network such as the corporate WAN 240 which supports a TCPIP protocol then the driver 60 itself could connect to the manufacturers server. However if, as described above, the driver 60 is connected to a different type of network such as a SCSI (Small Computer Systems Interface) bus then an intermediary software agent such as the software agent 50 described above is required.

Figure 2:
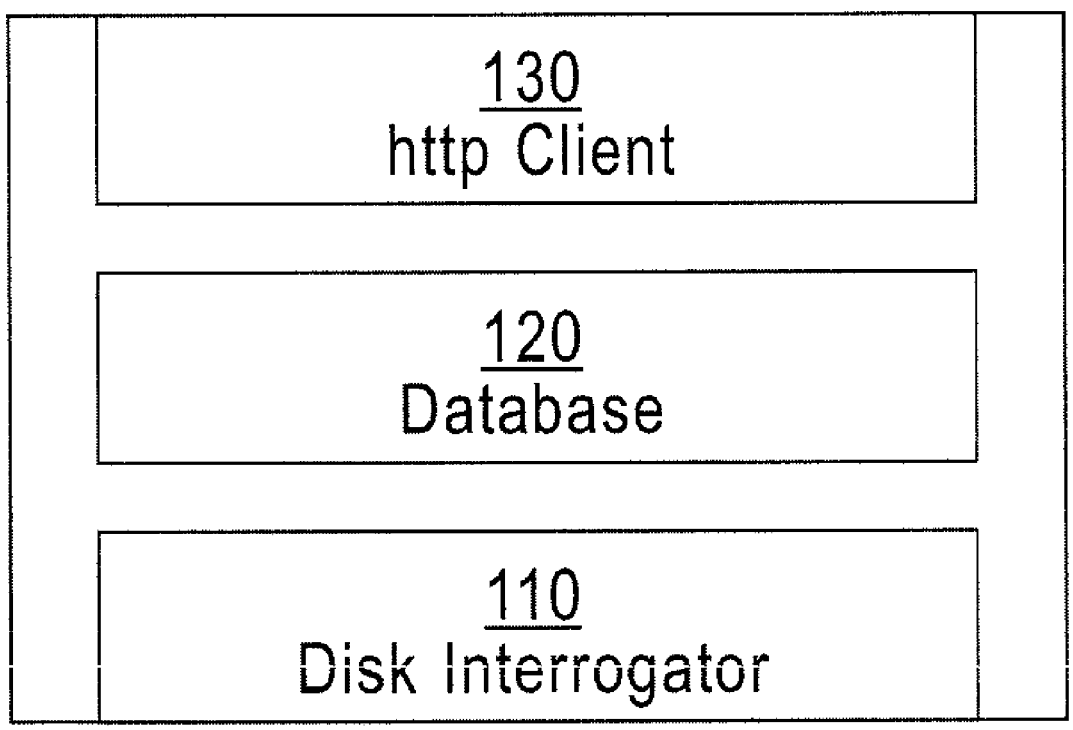
FIG. 2 shows a simple block diagram of a software agent forming part of the embodiment of FIG. 1.

Referring now also to FIG. 2, there is shown the internal structure of the software agent 50. A disk interrogator 110 uses SCSI commands to interrogate the attached disk drives 80. The gathered data is placed into the local database 57 by element 120. Periodically, a http client 130 connects to the manufacturers server 10 to relay the data.

Figure 3:
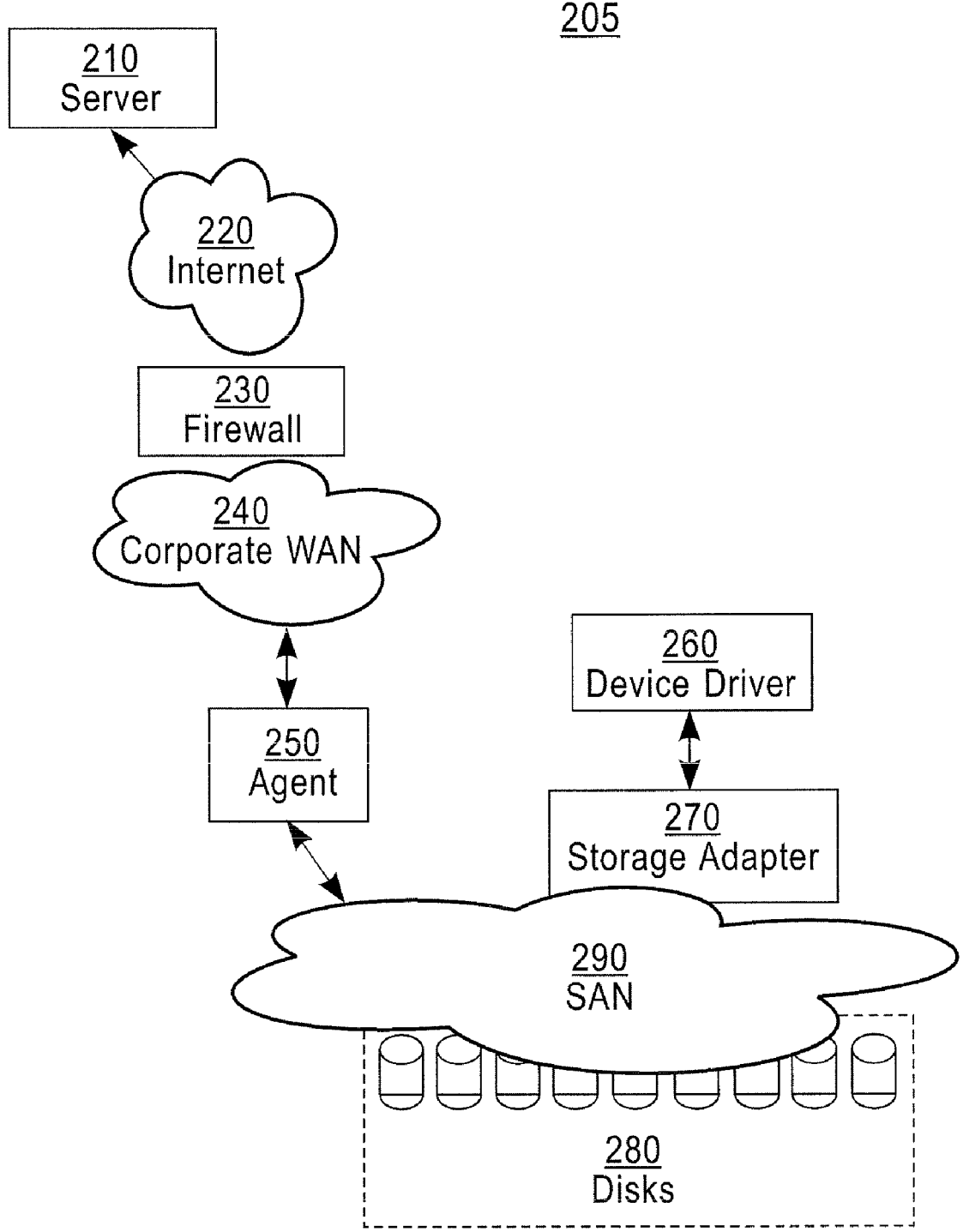
FIG. 3 shows an alternative embodiment of a system for predictive failure analysis in accordance with the invention.

Referring now also to FIG. 3, there is shown an alternate embodiment of the invention which incorporates a Storage Area Network (SAN) 290 as follows. Manufacturers server 210, corporate WAN 240, internet 220 and firewall 230 are identical to their counterparts in FIG. 1.

The disk drives 280 are coupled to the SAN 290, which in turn is coupled to device driver 260 via storage adapter 270. The driver 260, adapter 270, disk drives 280 and SAN 290 are all operated by a customer, and used for typical disk drive applications such as databases, servers, data storage and the like.

Software agent 250 is coupled to the disk drives 280 via the SAN 290, using a path other than that used for normal I/O operations with respect to the disk drives 280. In this way the predictive failure data is sent to the manufacturers server 210.

Figure 4:
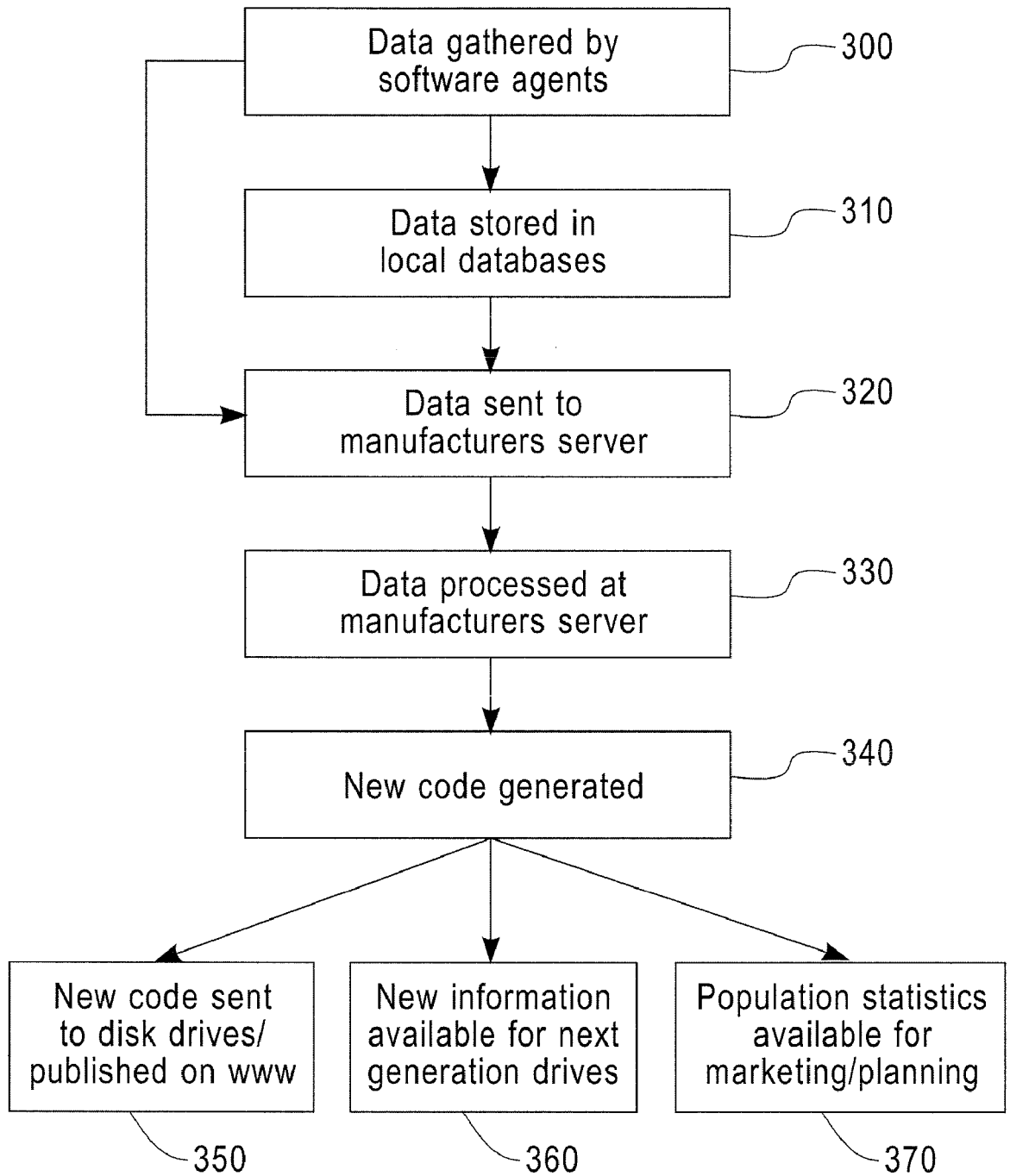
FIG. 4 shows a flow chart of a preferred method of operation of the embodiment of FIG. 1.

Referring now also to FIG. 4, there is shown an illustrative flow diagram of the capture and use of predictive failure data, according to the embodiments above. Data from disk drives typically distributed around the world are gathered locally by their respective software agents (block 300), and may be temporarily stored in local databases (block 310) or sent directly to the manufacturers server (block 320).

When the predictive failure data reaches the manufacturers server it is processed (block 330) and the results may be used for a number of purposes:

Firstly, (block 350) new microcode with improved error recovery may be made available for existing drives, targeted at the unexpected failure mode. Also new microcode may be provided which is more tolerant of certain error events than the original drive microcode and which will not call for unnecessary early drive replacement, where it has been established that the original algorithm was too aggressive, thus reducing service cost.

In both of these cases the new microcode may be available for download via the internet (e.g., through the world wide web—www) 20/220, or may be sent from the manufacturers server 10/210 directly to the software agent 50/150 (and to each software agent of the field population of disk drives. In this way the predictive failure analysis algorithms of each disk drive in the field may be continually improved rather than being fixed from the date of manufacture.

Secondly, (block 360) a detected failure mode may be used to provide design changes in the microcode or manufacturing methods for new drives, so as to reduce the likelihood of the detected failure mode occurring in the future.

Finally, (block 370) planning and budgeting considerations may be made by the manufacturer for increased or decreased drive replacement if trends in the data show that the drive population is ageing faster or slower than was predicted.

It will be understood that the device, system and method for predictive failure analysis described above provides the following advantages:

Recovered error information is provided from a large population of drives in the field population, and may be used to perform detailed analysis with greater predictability and less tolerance than present arrangements. Trends or unexpected failure modes may also be detected.

It will be appreciated by a person skilled in the art that alternative embodiments to those described above are possible. For example the above invention is applicable to a wide range of mass produced devices which currently are or may be in the future connected to a network including computer tape drives, printers, automobile engine management computers, mobile phones, washing machines and the like.

Furthermore it will be understood that the means of exchanging data between the disk drives 80/280 and the manufacturers server 10/210 may differ from that described above. For example for a disk drive not coupled to the internet, removable storage media may be used for the exchange of data. Similarly, disk drives which are coupled directly to the manufacturers server 10/210 (by a peer-to-peer arrangement or by virtue of being on the manufacturers network) do not need to use the internet 20/220.

What is claimed is:

1. A server for improving predictive failure attributes of distributed devices, comprising:
    a receiver for receiving, via a network, failure analysis data from individual ones of a plurality of distributed devices,
    where each device of said plurality of distributed devices comprises failure analysis software comprising a predictive failure analysis algorithm arranged for collecting failure analysis data of said distributed device and a communications device arranged for transmitting said failure analysis data to said network;
    wherein said server is arranged for analyzing said failure analysis data and for providing, in response to the analysis, an updated predictive failure analysis algorithm to the plurality of distributed devices;
    wherein each of said plurality of distributed devices is coupled to said network;
    wherein the updated predictive failure analysis algorithm is provided to the plurality of distributed devices in the form of a first microcode that is provided from the server to be used instead of a second microcode previously used by the plurality of distributed devices; and
    wherein execution of the first microcode results in the updated predictive failure analysis algorithm using different tolerances of certain error events when estimating an impending failure.

2. The server of claim 1, wherein each of said plurality of devices comprises an algorithm for managing an operation of a failure tolerant component and wherein said updated predictive failure analysis algorithm provides for improved operation of said failure tolerant component.

3. The server of claim 1, wherein said updated algorithm is transmitted to said each device via said network, wherein the network comprises the world wide web.

4. The server of claim 1, wherein said failure analysis data is used to improve at least one of design and manufacturing for future distributed devices.

5. The server of claim 1, wherein said failure analysis data provides an indication of operating lifespan of said plurality of distributed devices.

6. The server of claim 1, wherein each of said plurality of distributed devices is coupled to said network via an intermediary software agent.

7. The server of claim 6, wherein said intermediary software agent is installed on a local server.

8. The server of claim 7, wherein said local server comprises a database arranged for storing said failure analysis data, said local server being arranged for periodically uploading said failure analysis data to said server.

9. A server as in claim 6, wherein said agent uses an interrogator.

10. A server as in claim 6, wherein said agent uses a communications path other than that used for normal input and output (I/O) operations.

11. A server as in claim 1, wherein said network comprises a firewall, and where said failure analysis data is transmitted using a transmission protocol selected for being able to pass through said firewall.

12. A device comprising:
    a predictive failure analysis algorithm arranged for collecting failure analysis data of said device; and
    a communications device coupled to said predictive failure analysis algorithm arranged for transmitting said failure analysis data to a remote server via a network,
    wherein said remote server is arranged for analyzing said failure analysis data received from said device and from other devices and for providing an updated predictive failure analysis algorithm to the device and the other devices, wherein the updated predictive failure analysis algorithm is provided to the device in the form of a first microcode that is provided from the remote server to be used instead of a second microcode previously used by the device and the other devices, wherein execution of the first microcode results in the updated predictive failure analysis algorithm using different tolerances of certain error events when estimating an impending failure.

13. The device of claim 12, wherein said device comprises an algorithm for managing an operation of a failure tolerant component of said device and wherein said updated predictive failure analysis algorithm provides improved operation of said failure tolerant component.

14. The device of claim 13, wherein said updated predictive failure analysis algorithm is transmitted from the remote server to said device via said network.

15. The device of claim 12, wherein said failure analysis data is used to improve at least one of design and manufacturing for future devices.

16. The device of claim 12, wherein said updated predictive failure analysis algorithm provides an indication of operating lifespan of said device.

17. The device of claim 12, wherein said device is coupled to said network via an intermediary software agent.

18. The device of claim 17 wherein said intermediary software agent is installed on a local server.

19. The device of claim 18, wherein said local server comprises a database arranged for storing said failure analysis data from said device, said local server being arranged for periodically uploading said failure analysis data to a manufacturer's server.

20. A computer program comprising computer readable program code stored on a computer readable medium for performing failure analysis of a plurality of disk drives that comprise a part of at least one data storage system, comprising:
    first program code for collecting failure analysis data from individual ones of said disk drives and for transmitting said collected failure analysis data to a central server via a network and
    second program code, executed at said central server, for analyzing said failure analysis data and deriving an updated predictive failure analysis algorithm therefrom, where said updated predictive failure analysis algorithm is downloaded to said plurality of disk drives via the network, wherein the updated predictive failure analysis algorithm is provided to the plurality of disk drives in the form of a first microcode from the central server to be used instead of a second microcode previously used by the plurality of disk drives, wherein execution of the first microcode results in the updated predictive failure analysis algorithm using different tolerances of certain error events when estimating an impending failure.

21. A computer program as in claim 20, where said updated predictive failure analysis algorithm comprises revised disk drive operating program code.

22. A computer program as in claim 20, where said first program code is executed by a local server that comprises a part of said data storage system, and where said collected failure analysis data is locally stored in said data storage system prior to being transmitted to said central server.

23. A computer program as in claim 20, where said first program code is executed by a local server that comprises a part of said data storage system, and where said collected failure analysis data is transmitted to said central server as it is collected.

24. A computer program comprising computer readable program code stored on a computer readable medium for performing failure analysis of a plurality of disk drives that comprise a part of at least one data storage system, comprising
first program code, executed by a central server, for receiving, via a network, failure analysis data from said at least one data storage system for analyzing said failure analysis data and for deriving an updated predictive failure analysis algorithm therefrom, where said updated predictive failure analysis algorithm is downloaded to said plurality of disk drives via said network, wherein the updated predictive failure analysis algorithm is provided to the plurality of disk drives in the form of a first microcode to be used instead of a second microcode previously used by the plurality of disk drives, wherein execution of the first microcode results in the updated predictive failure analysis algorithm using different tolerances of certain error events when estimating an impending failure.

25. A computer program as in claim 24, further comprising second program code, executed by a component of said at least one data storage system, for collecting and transmitting said failure analysis data to said central server via said world wide web.

26. A computer program as in claim 24, where said updated predictive failure analysis algorithm comprises revised disk drive operating program code.

27. A computer program as in claim 25, where said second program code is executed by a local server that comprises a part of said data storage system, and where said collected failure analysis data is locally stored in said data storage system prior to being transmitted to said central server.

28. A computer program as in claim 25, where said second program code is executed by a local server that comprises a part of said data storage system, and where said collected failure analysis data is transmitted to said central server as it is collected.

29. A system for monitoring performance of a plurality of distributed devices via a network, comprising:
a network;
a central server having a monitoring capability, the central server being coupled to the network;
a plurality of distributed devices which are coupled to the network and which are monitored by the central server via the network, each of the plurality of distributed devices having a failure data analysis capability provided by a predictive failure analysis algorithm of the corresponding distributed device, each of the plurality of distributed devices providing predictive failure data to the central server via the network, wherein the central server modifies the predictive failure analysis algorithm in the form of a first microcode based on the predictive failure data to provide an updated predictive failure analysis algorithm in the form of a second microcode previously used by the plurality of distributed devices, wherein execution of the first microcode results in the updated predictive failure analysis algorithm using different tolerances of certain error events when estimating an impending failure.

30. A system as claimed in claim 29, wherein the updated predictive failure analysis algorithm is provided to distributed devices being manufactured.

31. A system as claimed in claim 29, wherein the updated predictive failure analysis algorithm is provided to each of the plurality of distributed devices via the network, wherein the distributed devices are data storage units.

32. A system as claim in claim 29, wherein the central server provides population statistics for distributed device ageing trends to a distributed device manufacturer for planning and budgeting considerations.

* * * * *